United States Patent
Zemitis et al.

(10) Patent No.: US 11,255,198 B1
(45) Date of Patent: Feb. 22, 2022

(54) TIP SHROUD WITH EXIT SURFACE FOR COOLING PASSAGES

(71) Applicant: General Electric Company, Schenectady, NY (US)

(72) Inventors: William Scott Zemitis, Simpsonville, SC (US); James Tyson Balkcum, III, Taylors, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/343,864

(22) Filed: Jun. 10, 2021

(51) Int. Cl.
*F01D 5/20* (2006.01)
*F01D 5/14* (2006.01)

(52) U.S. Cl.
CPC .............. *F01D 5/20* (2013.01); *F01D 5/143* (2013.01); *F05D 2220/32* (2013.01); *F05D 2240/24* (2013.01); *F05D 2240/307* (2013.01)

(58) Field of Classification Search
CPC . F01D 5/20; F01D 5/143; F01D 5/225; F05D 2240/307
See application file for complete search history.

(56) References Cited

U.S. PATENT DOCUMENTS

| | | | | |
|---|---|---|---|---|
| 6,340,284 B1 * | 1/2002 | Beeck | ................... | F01D 5/187 415/115 |
| 6,464,460 B2 * | 10/2002 | El-Nashar | ............... | F01D 5/187 416/191 |
| 6,499,950 B2 * | 12/2002 | Willett | ................... | F01D 25/12 416/97 R |
| 8,043,061 B2 | 10/2011 | Chiurato et al. | | |
| 8,057,186 B2 | 11/2011 | Brittingham | | |
| 8,192,166 B2 | 6/2012 | Beeck et al. | | |
| 9,464,529 B2 * | 10/2016 | Zambetti | ................ | F01D 5/225 |
| 10,934,852 B2 * | 3/2021 | Honkomp | ............... | F01D 25/12 |
| 11,131,200 B2 * | 9/2021 | Strohl | ..................... | F01D 11/08 |
| 2001/0006600 A1 * | 7/2001 | El-Nashar | ............... | F01D 5/187 416/92 |
| 2012/0070309 A1 * | 3/2012 | Zambetti | ................ | F01D 5/225 416/97 R |
| 2020/0131915 A1 * | 4/2020 | Strohl | ...................... | B22F 5/04 |
| 2020/0173288 A1 * | 6/2020 | Honkomp | ................ | F01D 5/18 |

* cited by examiner

*Primary Examiner* — Eldon T Brockman
(74) *Attorney, Agent, or Firm* — Charlotte Wilson; Hoffman Warnick LLC

(57) ABSTRACT

A tip shroud for a turbine blade of a gas turbine system includes a body coupled to a radial outer end of an airfoil of the turbine blade. The tip shroud may include at least one circumferentially extending tip rail. A first edge wall of the tip shroud extends axially and radially outwardly from the body along at least one of a leading circumferential-facing edge or a trailing circumferential-facing edge of the body and includes a circumferentially facing surface. Cooling passages are defined in the body and extend circumferentially therein to cool an area near the first edge wall. The tip shroud includes an exit surface adjacent the first edge wall, where the exit surface includes an exit opening through which at least one of cooling passages exits the body. The exit surface is angled relative to the circumferentially facing surface of the first edge wall in a range of 15° to 80°.

20 Claims, 12 Drawing Sheets

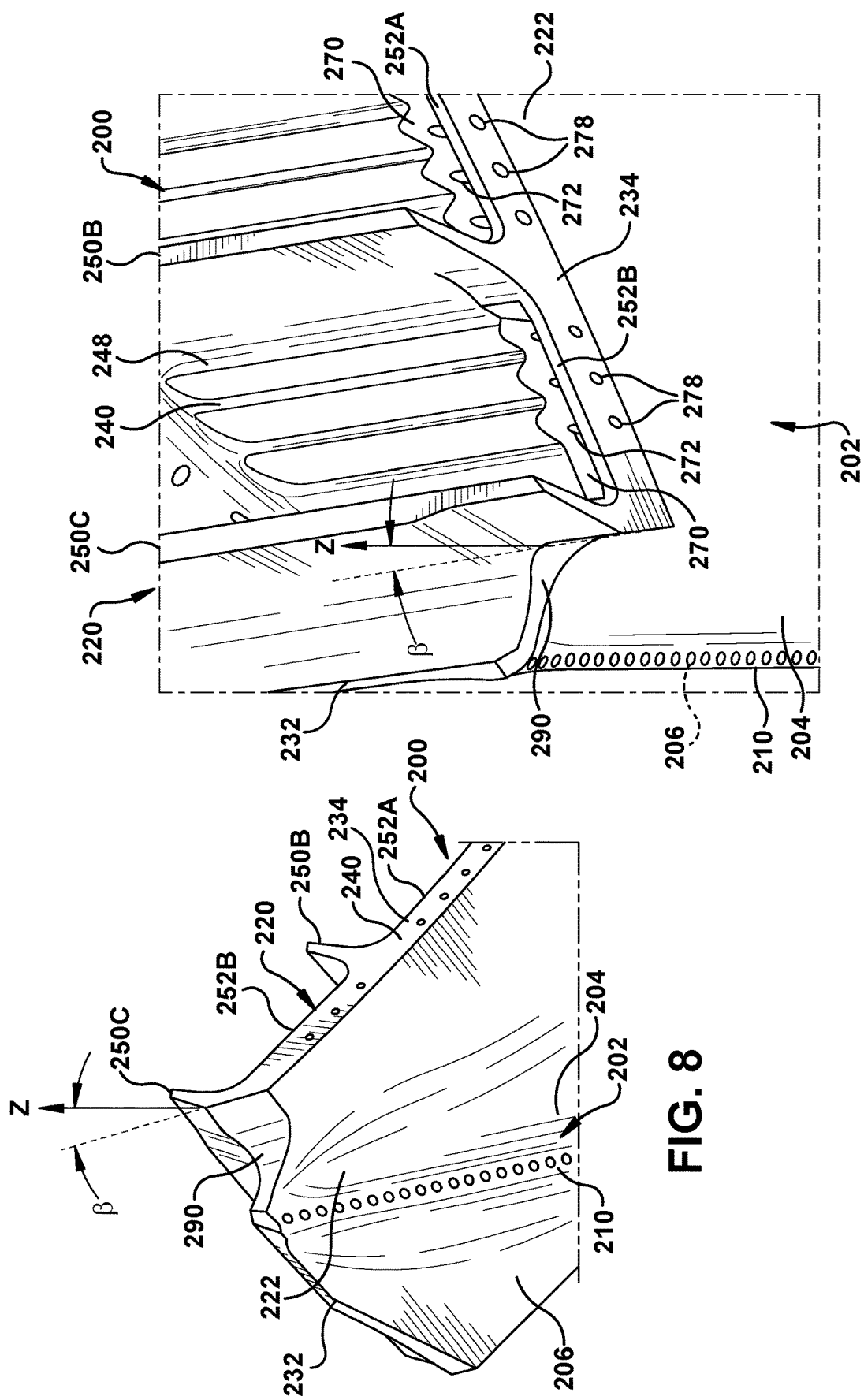

TIP SHROUD WITH EXIT SURFACE FOR COOLING PASSAGES

TECHNICAL FIELD

The disclosure relates generally to turbomachines and, more particularly, to a tip shroud for a turbine blade having an exit surface for cooling passages, allowing removal of material for mass balancing.

BACKGROUND

Turbomachines, such as gas turbine systems, are utilized to generate power for electric generators. In general, gas turbine systems generate power by passing a fluid (e.g., hot gas) through a turbine component of the gas turbine system. More specifically, inlet air may be drawn into a compressor and may be compressed. Once compressed, the inlet air is mixed with fuel, which may be ignited by a combustor of the gas turbine system to form the operational fluid (e.g., hot gas) of the gas turbine system. The fluid may then flow through a fluid flow path for rotating a plurality of rotating blades and a rotor or shaft of the turbine component for generating the power. The fluid may be directed through the turbine component via the plurality of rotating blades and a plurality of stationary nozzles or vanes positioned between the rotating blades. As the plurality of rotating blades rotate the rotor of the gas turbine system, a generator, which is coupled to the rotor, may generate power from the rotation of the rotor.

To improve operational efficiencies, rotating blades may include tip shrouds on radially outer ends thereof. The tip shrouds interact with an inner surface of a stationary casing to direct the operational fluid. The tip shrouds include a mass of material that presents a number of mechanical integrity issues. One challenge is addressing creep, or the gradual deformation of the tip shroud under the stress of rotational forces exerted on the rotating blades. Creep can create a number of mechanical issues such as deformation of the airfoil or the tip shroud. In addition, excessive bending moments created by a mass imbalance in the tip shroud can exacerbate creep issues. Hence, another challenge is ensuring mass balance in the tip shroud to provide ideal aerodynamic, heat transfer, mechanical and aeromechanic performance.

BRIEF DESCRIPTION

All aspects, examples, and features mentioned below can be combined in any technically possible way.

An aspect of the disclosure a tip shroud for a turbine blade, comprising: a body coupled to a radial outer end of an airfoil of the turbine blade, the airfoil including a pressure side and a suction side and the body including a leading circumferential-facing edge and a trailing circumferential-facing edge; at least one tip rail extending radially outwardly from the body and extending generally along a circumferential length of the body; a first plurality of cooling passages defined in the body and extending circumferentially therein; and at least one first edge wall arrangement along at least one of the leading circumferential-facing edge and the trailing circumferential-facing edge of the body, each first edge wall arrangement including: a first edge wall extending axially and radially outwardly from the body along the at least one of the leading circumferential-facing edge and the trailing circumferential-facing edge of the body, the first edge wall including a first circumferentially facing surface, and an exit surface adjacent the first edge wall, the exit surface having an exit opening defined therein through which at least one of the first plurality of cooling passages exit the body, wherein the exit surface is angled relative to the first circumferentially facing surface of the first edge wall in a range of 15° to 80°.

Another aspect of the disclosure includes any of the preceding aspects, and the first edge wall and the exit surface extend axially between a pair of axially opposing, radially extending walls in the body.

Another aspect of the disclosure includes any of the preceding aspects, and the first edge wall includes at least one opening therethrough.

Another aspect of the disclosure includes any of the preceding aspects, and the exit opening for the at least one of the first plurality of cooling passages is linearly aligned with the at least one opening in the first edge wall.

Another aspect of the disclosure includes any of the preceding aspects, and further includes a curved opening defined in a trailing edge of the body adjacent a trailing edge of the airfoil, wherein the curved opening is not filled by the body of an adjacent tip shroud.

Another aspect of the disclosure includes any of the preceding aspects, and the curved opening defines a plane angled in a range of 15° and 45° relative to a radial direction.

Another aspect of the disclosure includes any of the preceding aspects, and further includes at least one second edge wall arrangement along at least one of the leading circumferential-facing edge and the trailing circumferential-facing edge of the body, each second edge wall arrangement including: a second edge wall extending axially and radially outwardly from the body along the at least one of the leading circumferential-facing edge and the trailing circumferential-facing edge of the body; and an inner wall extending axially and radially outwardly from the body, the inner wall parallel to and circumferentially spaced from the second edge wall to create a radially extending pocket therebetween, the inner wall having an exit opening defined therein for at least one of a second plurality of cooling passages defined in the body and extending circumferentially therein, the exit opening circumferentially facing into the radially extending pocket.

Another aspect of the disclosure includes any of the preceding aspects, and the second edge wall includes at least one opening therethrough.

Another aspect of the disclosure includes any of the preceding aspects, and the exit opening for the at least one of the first plurality of cooling passages is linearly aligned with the at least one opening in the first edge wall.

Another aspect of the disclosure includes any of the preceding aspects, and the at least one tip rail includes a plurality of tip rails, and wherein the at least one first edge wall arrangement is axially positioned between a pair of the plurality of tip rails.

Another aspect of the disclosure includes any of the preceding aspects, and the exit surface is not planar.

An aspect of the disclosure provides a turbine blade, comprising: a root section; an airfoil coupled to the root section, the airfoil including a pressure side and a suction side; and a tip shroud including: a body coupled to a radial outer end of an airfoil of the turbine blade, the airfoil including a pressure side and a suction side and the body including a leading circumferential-facing edge and a trailing circumferential-facing edge; at least one tip rail extending radially outwardly from the body and extending generally along a circumferential length of the body; a first plurality of cooling passages defined in the body and extending circumferentially therein; and at least one first edge wall arrangement along at least one of the leading circumferential-facing edge and the trailing circumferential-facing edge of the body, each first edge wall arrangement including: a first edge wall extending axially and radially outwardly from the body along the at least one of the leading circumferential-facing edge and the trailing circumferential-facing edge of the body, the first edge wall including a first circumferentially facing surface, and an exit surface adjacent the first edge wall, the exit surface having an exit opening defined therein through which at least one of the first plurality of cooling passages exit the body, wherein the exit surface is angled relative to the first circumferentially facing surface of the first edge wall in a range of 15° to 80°.

Another aspect of the disclosure includes any of the preceding aspects, and the first edge wall and the exit surface extend axially between a pair of axially opposing, radially extending walls in the body.

Another aspect of the disclosure includes any of the preceding aspects, and the first edge wall includes at least one opening therethrough.

Another aspect of the disclosure includes any of the preceding aspects, and each exit opening for the at least one of the first plurality of cooling passages is linearly aligned with one of the second plurality of cooling passages.

Another aspect of the disclosure includes any of the preceding aspects, and further includes: a curved opening defined in a trailing edge of the body adjacent a trailing edge of the airfoil, wherein the curved opening is not filled by the body of an adjacent tip shroud.

Another aspect of the disclosure includes any of the preceding aspects, and further includes at least one second edge wall arrangement along at least one of the leading circumferential-facing edge and the trailing circumferential-facing edge of the body, each second edge wall arrangement including: a second edge wall extending axially and radially outwardly from the body along the at least one of the leading circumferential-facing edge and the trailing circumferential-facing edge of the body; and an inner wall extending axially and radially outwardly from the body, the inner wall parallel to and circumferentially spaced from the second edge wall to create a radially extending pocket therebetween, the inner wall having an exit opening defined therein for at least one of a second plurality of cooling passages defined in the body and extending circumferentially therein, each exit opening circumferentially facing into the radially extending pocket.

Another aspect of the disclosure includes any of the preceding aspects, and the second edge wall includes at least one opening therethrough, and wherein the exit opening for the at least one of the second plurality of cooling passages is linearly aligned with one of the at least one openings through the second edge wall.

Another aspect of the disclosure includes any of the preceding aspects, and the at least one tip rail includes a plurality of tip rails, and wherein the at least one first edge wall arrangement is axially positioned between a pair of the plurality of tip rails.

Another aspect of the disclosure includes a gas turbine comprising the turbine blade of any of the preceding aspects.

Two or more aspects described in this disclosure, including those described in this summary section, may be combined to form implementations not specifically described herein.

The details of one or more implementations are set forth in the accompanying drawings and the description below.

Other features, objects, and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 8 shows a radially outward perspective view of a trailing edge of an airfoil and a leading circumferential-facing edge of a tip shroud, according to other embodiments of the disclosure;

FIG. 9 shows a radially inward perspective view of a trailing edge of an airfoil and a leading circumferential-facing edge of a tip shroud, according to other embodiments of the disclosure;

Figure 1:
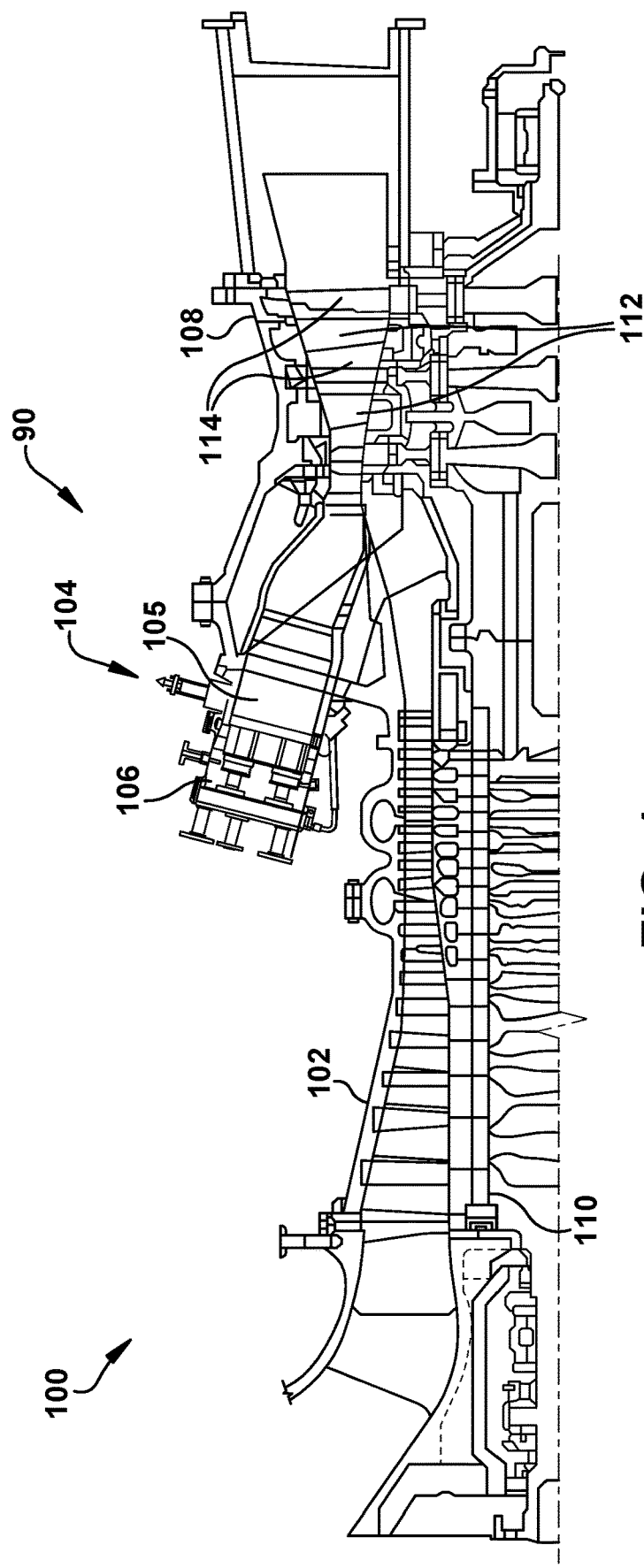
FIG. 1 is a schematic view of an illustrative gas turbine (GT) system.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant machine components within a turbomachine. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow (i.e., the direction from which the flow originates). The terms "forward" and "aft," without any further specificity, refer to directions, with "forward" referring to the front or compressor end of the engine, and "aft" referring to the rearward section of the turbomachine.

It is often required to describe parts that are disposed at differing radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to a direction perpendicular to an axis, i.e., a plane in which movement or position may be around the axis. It will be appreciated that such terms may be applied in relation to the center axis of the turbine.

In addition, several descriptive terms may be used regularly herein, as described below. The terms such as "first," "second," and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently describe component or element may or may not be present, and that the description includes instances where the event occurs or the component is present and instances where it does not or is not present.

Where an element or layer is referred to as being "on," "engaged to," "connected to," or "coupled to" another element or layer, it may be directly on, engaged to, connected to, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides a tip shroud for a turbine blade of a gas turbine system. The tip shroud may include a body coupled to a radial outer end of an airfoil of the turbine blade. The airfoil includes a pressure side and a suction side. The body of the tip shroud includes a leading circumferential-facing edge and a trailing circumferential-facing edge. The tip shroud may include at least one tip rail extending radially outwardly from the body and extending generally along a circumferential length of the body. Cooling passages are defined in the body and extend circumferentially in the body to cool an area near a first edge wall. The tip shroud also includes at least one first edge wall arrangement along at least one of the leading circumferential-facing edge and the trailing circumferential-facing edge of the body. The first edge wall arrangement(s) may include a first edge wall extending axially and radially outwardly from the body of the tip shroud along the leading and/or trailing circumferential-facing edges of the body. The first edge wall includes a circumferentially facing surface.

Where the tip shroud would otherwise include an inner wall spaced from the first edge wall and through which the cooling passages exit the body, the tip shroud in embodiments of the disclosure includes an exit surface adjacent the first edge wall. The exit surface includes an exit opening defined therein through which at least one of the cooling passages exits the body. The exit surface is angled relative to the circumferentially facing surface of the first edge wall in a range of 15° to 80°. Hence, the exit surface allows less material to be used at any selected circumferential-facing edge of the tip shroud to enhance mass balance, while also providing adequate cooling.

Referring to the drawings, FIG. 1 is a schematic view of an illustrative turbomachine 90 in the form of a gas turbine (GT) system 100 (hereinafter "GT system 100"). GT system 100 includes a compressor 102 and a combustor 104. Combustor 104 includes a combustion region 105 and a fuel nozzle assembly 106. GT system 100 also includes a turbine 108 and a common compressor/turbine rotor shaft 110 (hereinafter referred to as "rotor shaft 110"). In one non-limiting embodiment, GT system 100 may be a GT26 engine, commercially available from General Electric Company, Greenville, S.C. The present disclosure is not limited to any one particular GT system and may be implanted in connection with other engines including, for example, other HA, F, B, LM, GT, TM and E-class engine models of General Electric Company, and engine models of other companies. Further, the teachings of the disclosure are not necessarily applicable to only a GT system and may be applied to other types of turbomachines, e.g., steam turbines, jet engines, compressors, etc.

Figure 2:
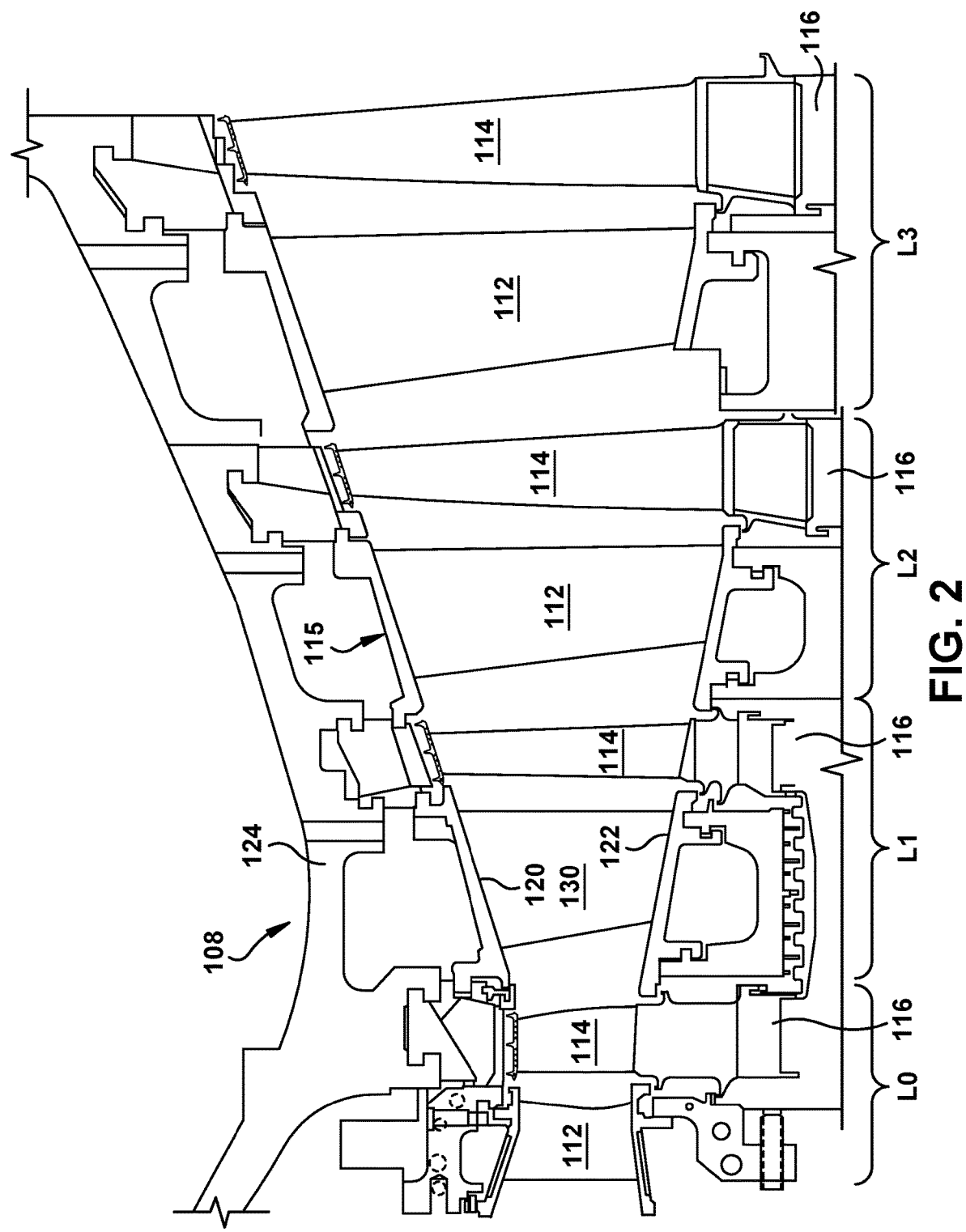
FIG. 2 is a cross-sectional view of an illustrative turbine that may be used with the GT system in FIG. 1.

FIG. 2 shows a cross-section view of an illustrative portion of turbine 108 with four stages L0-L3 that may be used with GT system 100 in FIG. 1. The four stages are referred to as L0, L1, L2, and L3. Stage L0 is the first stage and is the smallest (in a radial direction) of the four stages. Stage L1 is the second stage and is the next stage in an axial direction (that is, downstream from Stage L0). Stage L2 is the third stage and is the next stage in an axial direction (that is, downstream from Stage L1). Stage L3 is the fourth, last stage (downstream from Stage L2) and is the largest (in a radial direction). It is to be understood that four stages are shown as one non-limiting example only, and each turbine may have more or less than four stages.

In turbine 108, a set of stationary vanes or nozzles 112 cooperate with a set of rotating turbine blades 114 to form each stage L0-L3 of turbine 108 and to define a portion of a flow path through turbine 108. Rotating turbine blades 114 in each set are coupled to a respective rotor wheel 116 that couples them circumferentially to rotor shaft 110. That is, set of rotating turbine blades 114 is mechanically coupled in a circumferentially spaced manner to each rotor wheel 116. A static blade section 115 includes stationary nozzles 112 circumferentially spaced around rotor shaft 110. Each nozzle 112 may include at least one endwall (or platform) 120, 122 connected with an airfoil 130. In the example shown, nozzle 112 includes a radially outer endwall 120 and a radially inner endwall 122. Radially outer endwall 120 couples nozzle 112 to a casing 124 of turbine 108.

In operation, air flows through compressor 102, and compressed air is supplied to combustor 104. Specifically, the compressed air is supplied to fuel nozzle assembly 106 that is integral to combustor 104. Fuel nozzle assembly 106 is in flow communication with combustion region 105. Fuel nozzle assembly 106 is also in flow communication with a fuel source (not shown in FIG. 1) and channels fuel and air to combustion region 105. Combustor 104 ignites and combusts fuel. Combustor 104 is in flow communication with turbine 108 within which gas stream thermal energy is converted to mechanical rotational energy. Turbine 108 is rotatably coupled to and drives rotor shaft 110. Compressor 102 may also be rotatably coupled to rotor shaft 110. In the illustrative embodiment, there is a plurality of combustors 104 and fuel nozzle assemblies 106. In the following discussion, unless otherwise indicated, only one of each component will be discussed. At least one end of rotating rotor shaft 110 may extend axially away from turbine 108 and may be attached to a load or machinery (not shown), such as, but not limited to, a generator, a load compressor, and/or another turbine.

Figure 3:
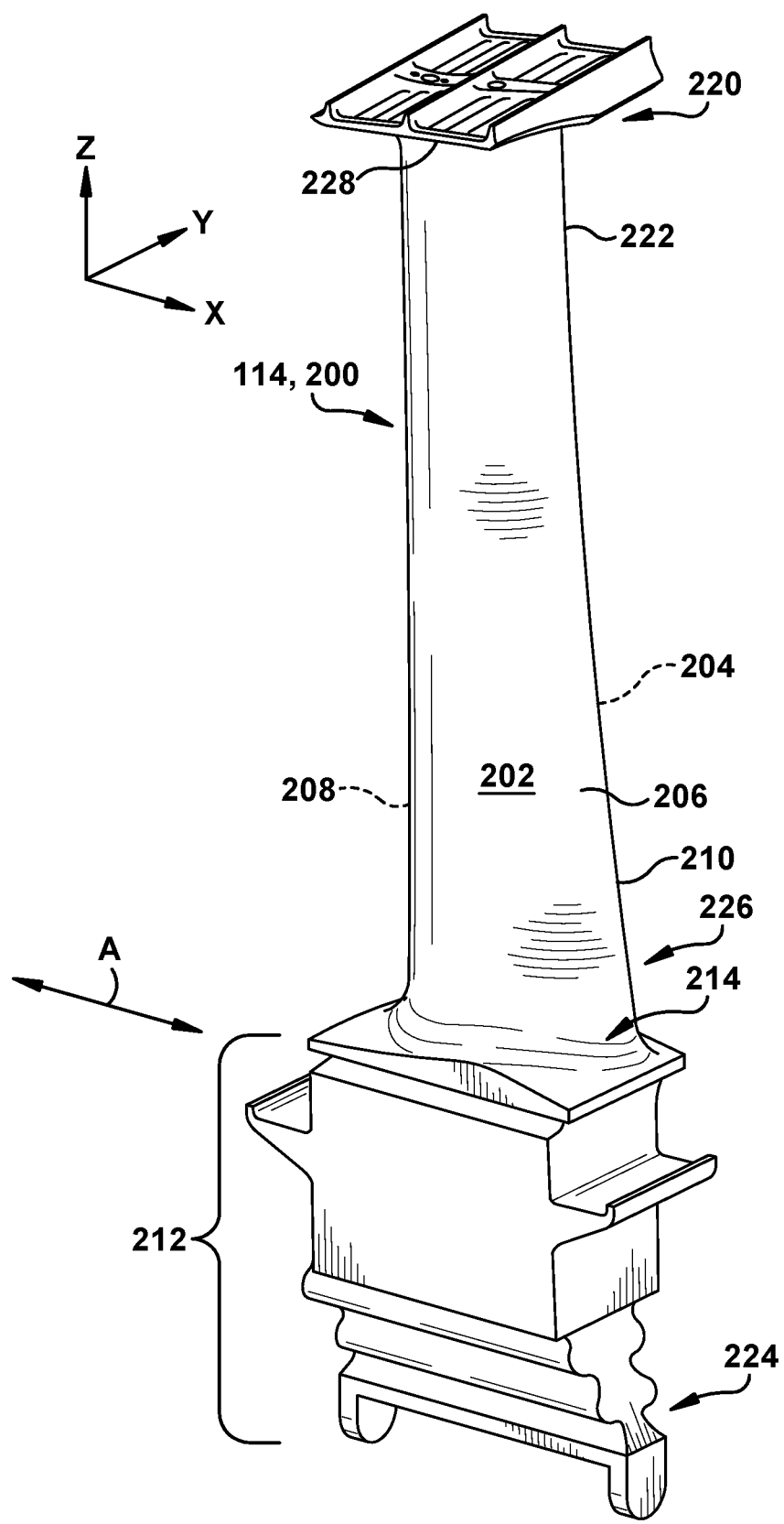
FIG. 3 shows a perspective view of a turbine blade of the type in which embodiments of the disclosure may be employed.

FIG. 3 shows an enlarged perspective view of an illustrative turbine blade 200 in detail. For purposes of description, a legend may be provided in the drawings in which the X-axis extends generally axially (same as arrow A), the Y-axis extends generally perpendicular to axis A of rotor shaft 110 (FIG. 1) (indicating a circumferential plane or direction), and the Z-axis extends radially, relative to an axis A of rotor shaft 110 (FIG. 1). The Z-axis is perpendicular to the X-axis and the Y-axis. Blade 200 is a rotatable (dynamic) blade, which is part of set of turbine blades 114 circumferentially dispersed about rotor shaft 110 (FIG. 1) in a stage of a turbine (e.g., turbine 108).

During operation of turbine 108, as a working fluid (e.g., gas in GT system 100, or steam in a steam turbine) is directed across the blade's airfoil, blade 200 will initiate rotation of a rotor shaft (e.g., rotor shaft 110) and rotate about axis A defined by rotor shaft 110. It is understood that blade 200 is configured to couple (mechanically via fasteners, welds, slot/grooves, etc.) with a plurality of similar or distinct blades (e.g., blades 200 or other blades) to form set of turbine blades 114 (FIG. 2) in a stage of turbine 108 (FIG. 2). Referring to FIG. 2, blade 200 can be located in any stage (L0-L3).

Returning to FIG. 3, blade 200 can include an airfoil 202 having a pressure side 204 (obstructed in this view) and a suction side 206 opposing pressure side 204. Blade 200 can also include a leading edge 208 spanning between pressure side 204 and suction side 206, and a trailing edge 210 opposing a leading edge 208 and spanning between pressure side 204 and suction side 206. As noted, pressure side 204 of airfoil 202 generally faces upstream, and suction side 206 generally faces downstream.

As shown, blade 200 can also include a root section 212 connected with airfoil 202 and a turbine blade tip shroud 220 (hereinafter "tip shroud 220") on a radial outer end 222 of airfoil 202. Root section 212 can be connected with airfoil 202 along pressure side 204, suction side 206, leading edge 208 and trailing edge 210. In various embodiments, blade 200 can include a fillet 214 proximate a radially inner end 226 of airfoil 202, fillet 214 connecting airfoil 202 and root section 212. Fillet 214 can include a weld or braze fillet, which may be formed via conventional MIG welding, TIG welding, brazing, etc. Root section 212 is illustrated in FIG. 3 as including a dovetail 224, but root section 212 can have any suitable configuration to connect to rotor shaft 110. Specifically, root section 212 is configured to fit into a mating slot (e.g., dovetail slot) in the turbine rotor shaft (e.g., a rotor wheel of rotor shaft 110) and to mate with adjacent components of other blades 200. Root section 212 is intended to be located radially inboard of airfoil 202 and be formed in any complementary configuration to the rotor shaft.

Tip shroud 220 can be connected with airfoil 202 along pressure side 204, suction side 206, leading edge 208 and trailing edge 210. In various embodiments, blade 200 can include a fillet 228 proximate radially outer end 222 of airfoil 202. Fillet 228 connects airfoil 202 and tip shroud 220. Fillet 228 can include a weld or braze fillet, which may be formed via conventional MIG welding, TIG welding, brazing, etc. Tip shroud 220 is configured to interact with an inner surface of casing 124 (FIG. 2) and/or a casing shroud therein (not shown).

Figure 4:
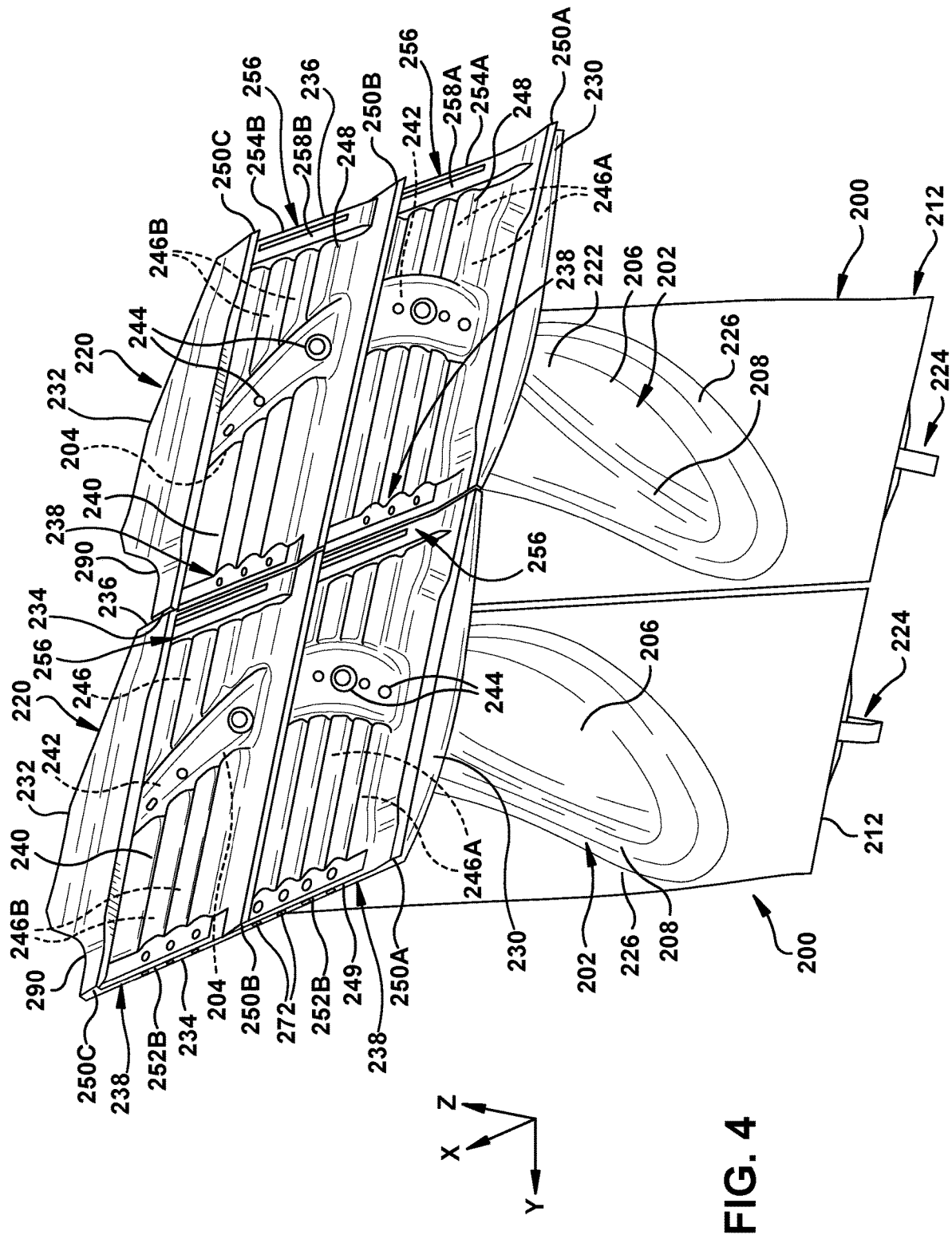
FIG. 4 shows a radially inward perspective view of a pair of turbine blades each including a tip shroud, according to embodiments of the disclosure.
Figure 5:
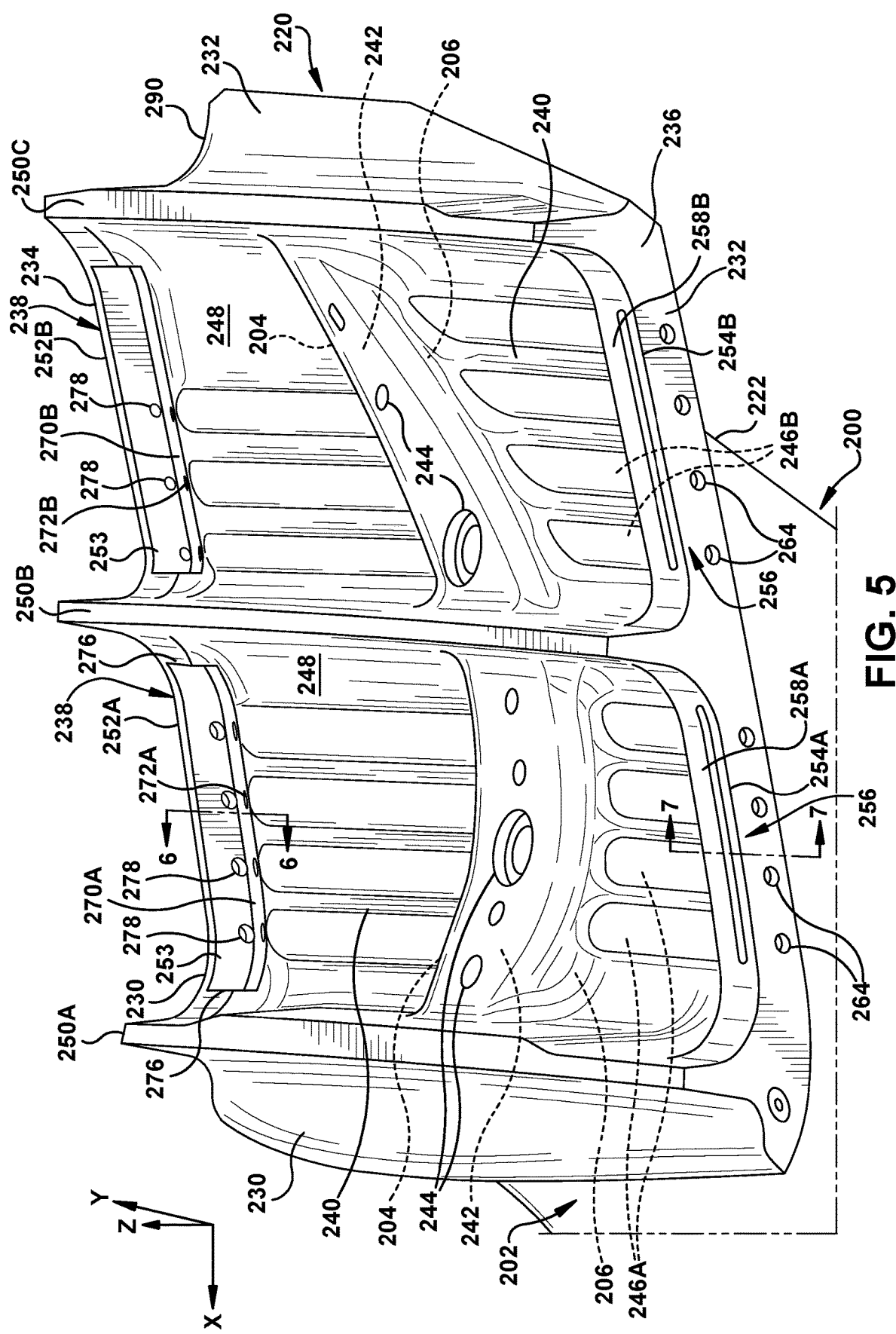
FIG. 5 shows a perspective view of a tip shroud, according to embodiments of the disclosure.

FIG. 4 shows a radially inward, perspective view of a pair of adjacent turbine blades 200 and, in particular, adjacent tip shrouds 220; and FIG. 5 shows a perspective view of a single tip shroud 220. As will be apparent from the description that follows, embodiments of the disclosure may include repeating structure. For example, where tip shroud 220 includes more than two tip rails 250, a first edge wall arrangement 238 according to embodiments of the disclosure, as will be described herein, may be repeated between the different pairs of tip rails 250. To differentiate between repeating structure, where necessary, numeric references may be accompanied by a letter reference, e.g., A, B, C, etc. Where a reference letter is omitted from repeating structures, depending on the apparent context, a single instant of the structure is being referenced alone or a number of the structures are being collectively referenced.

With reference to FIGS. 3-5, tip shroud 220 for turbine blade 200 may include a body 240 coupled to radial outer end 222 of airfoil 202 of turbine blade 200. As noted, airfoil 202 includes pressure side 204 and suction side 206. In FIGS. 4 and 5, an airfoil cooling chamber 242 has the general shape of airfoil 202 and is mostly radially inward of tip shroud 220. It is understood that one or more cooling chambers (not shown) within airfoil 202 deliver a coolant to tip shroud 220 and airfoil cooling chamber 242. Some of the coolant exits cooling chamber 242 through openings 244 therein and/or may be directed to tip rails 250, but other coolant is directed through one or more sets (pluralities) of cooling passages 246 defined in body 240 and extending circumferentially therein (along the Y axis). Cooling passages 246 appear as rounded ribs in a radial outer surface 248 (FIG. 5) of body 240. Tip shroud 220 has a leading edge 230, a trailing edge 232, a leading circumferentially-facing edge 234, and a trailing circumferentially-facing edge 236. Leading circumferentially-facing edge 234 is so termed because it is on pressure side 204 of airfoil 202, and trailing circumferentially-facing edge 236 is so termed because it is on suction side 206 of airfoil 202.

As understood in the field, different extents of tip shroud 220 overhanging from airfoil 202 can cause mass imbalance. For example, in the illustrative drawings, leading circumferentially-facing edge 234 may extend slightly farther from airfoil 202 than trailing circumferentially-facing edge 236, creating an imbalance.

Tip shroud 220 may also include at least one tip rail 250. Each tip rail 250 extends radially outwardly from body 240 and extends generally along a circumferential length of body 240. As used herein, "generally" indicates within +/−5° relative to the direction stated, such as generally along a circumferential length of body 240, or generally parallel to tip rails 250. For purposes of description, tip shroud 220 will be mainly illustrated with three axially spaced tip rails 250A-C. Here, tip shroud 220 may include a first tip rail 250A extending radially outwardly from body 240 and extending generally along a circumferential length of body 240, and a second tip rail 250B extending radially outwardly from body 240 and extending generally along the circumferential length of the body. In the non-limiting example shown, tip shroud 220 also includes a third tip rail 250C extending radially outwardly from body 240 and extending generally along a circumferential length of body 240. It is emphasized that the teachings of the disclosure can be applied to tip shroud 220 having any number of tip rails, e.g., one (FIG. 12), two (FIG. 13) and more than three. Where two or more tip rails 250 are used, each tip rail 250 is axially spaced (X-axis) from an adjacent tip rail. In the example shown, second tip rail 250B is axially spaced from first tip rail 250A, and third tip rail 250C is axially spaced from second tip rail 250B. As illustrated, a plurality of cooling passages 246 extends between circumferentially adjacent tip rail(s) 250, e.g., between each pair of tip rails 250 and generally parallel to tip rail(s) 250. A first plurality of cooling passages 246A extends between first and second tip rails 250A, 250B, and a second plurality of cooling passages 246B extends between second and third tip rails 250B, 250C.

Figure 6:
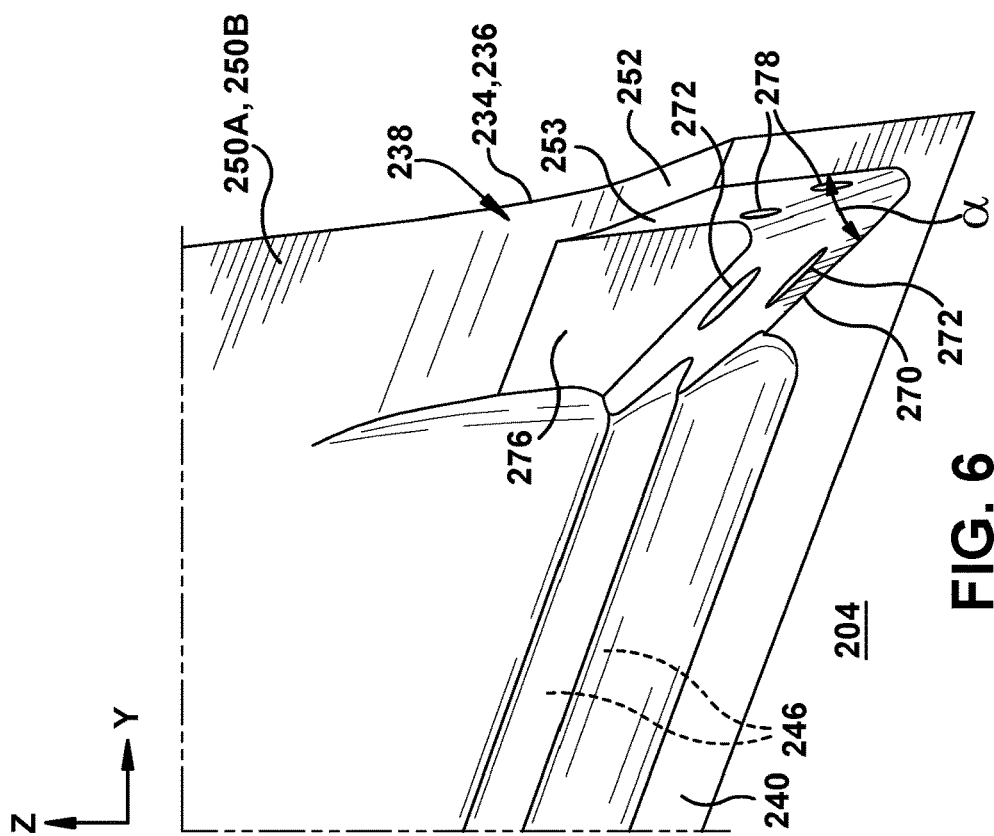
FIG. 6 shows a cross-sectional view along view line 6-6 in FIG. 5 of an exit surface adjacent an edge wall of a tip shroud, according to embodiments of the disclosure.

FIG. 6 shows an enlarged cross-sectional view along view line 6-6 in FIG. 5 of a first edge wall arrangement 238, according to embodiments of the disclosure. As will be described, each first edge wall arrangement 238 may be selectively positioned along at least one of leading circumferential-facing edge 234 and trailing circumferential-facing edge of the body 236, to reduce mass. In the examples of FIGS. 4 and 5, first edge wall arrangements 238 are positioned along leading circumferential-facing edge 234 of tip shroud(s) 220, e.g., to address an imbalance in that direction. Hence, in the examples shown in FIGS. 4-5, first edge wall arrangements 238 are on pressure side 204 of airfoil 202.

First edge wall arrangements 238 include a first edge wall 252 extending axially and radially outwardly from body 240 along at least one of leading circumferential-facing edge 234 (shown) and trailing circumferential-facing edge 236 (e.g., FIG. 10) of body 240. As will be described further, tip shroud 220 may include more than one first edge wall arrangement 238. In this case, a first edge wall 252A may extend axially and radially outwardly from body 240 along at least one of leading and trailing circumferential-facing edges 234 (shown), 236 (e.g., FIG. 10) of body 240, and another first edge wall 252B may extend axially and radially outwardly from body 240 along at least one of leading and trailing circumferential-facing edges 234, 236 of body 240. First edge wall(s) 252 each includes a circumferentially facing surface 253, i.e., facing towards airfoil 202. First edge wall(s) 252 acts as a circumferentially outer edge wall of tip shroud 220 on pressure side 204 and/or suction side 206 of airfoil 202. In some instances, first edge walls 252 may act as a stiffener for tip shroud 220. Where pairs of tip rails 250 are present, first edge wall arrangements 238 may extend axially between pairs of tip rails 250. For example, a first edge wall 252A may extend axially between first tip rail 250A and second tip rail 250B, and a first edge wall 252B may extend axially between second and third tip rails 250B, 250C (FIG. 5).

Figure 7:
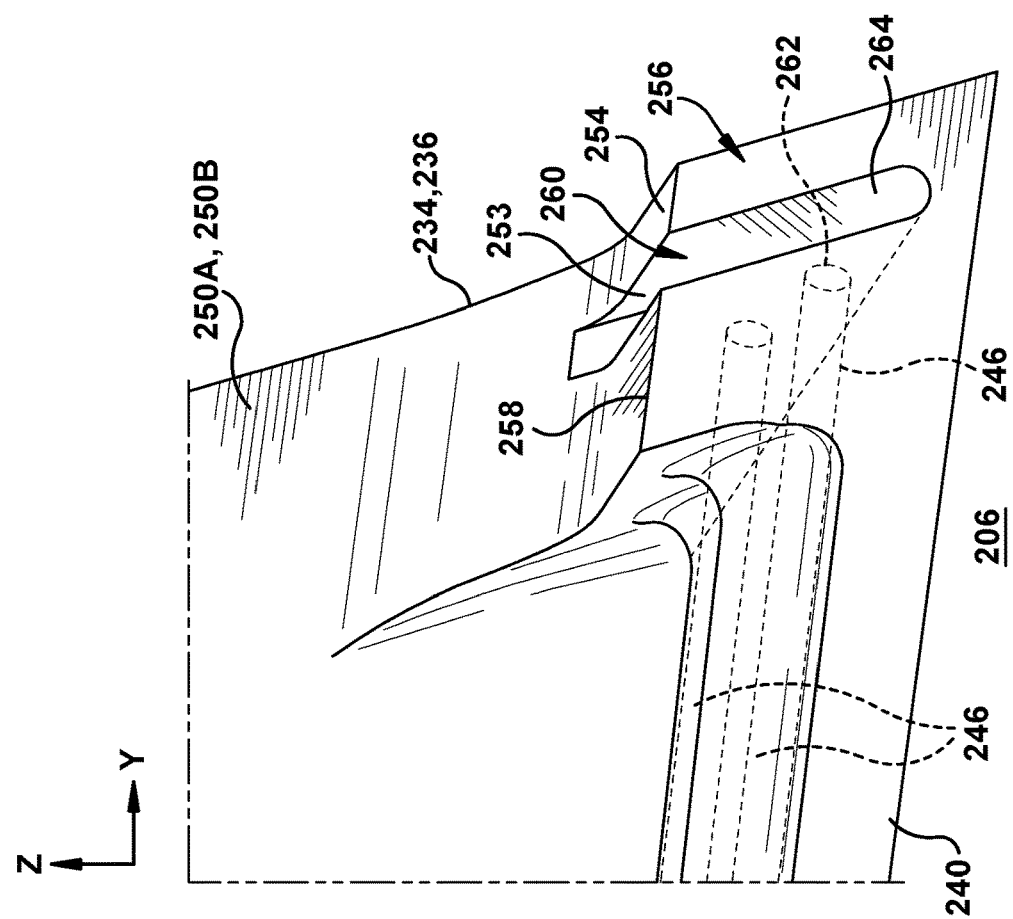
FIG. 7 shows a cross-sectional view along view line 7-7 in FIG. 5 of an inner wall adjacent an edge wall of a tip shroud, according to embodiments of the disclosure.

FIG. 7 shows an enlarged cross-sectional view along view line 7-7 in FIG. 5 of a second edge wall arrangement 256 of tip shroud 220. Second edge wall arrangement(s) 256 are positioned along at least one of leading circumferential-facing edge 234 and trailing circumferential-facing edge 236 of body 240, i.e., where first edge wall arrangement 238 is not present and where mass reduction may not be necessary. Second edge wall arrangement(s) 256 include a second edge wall 254 extending axially and radially outwardly from body 240 along at least one of leading circumferential-facing edge 234 and trailing circumferential-facing edge 236 of body 240. In the examples shown in FIGS. 4-5, second edge wall arrangements 256 are on suction side 206 of airfoil 202.

Second edge wall arrangement(s) 256 also include an inner wall 258 extending axially and radially outwardly from body 240. Where pairs of tip rails 250 are present, each second edge wall arrangement 256 may extend axially between pairs of tip rails 250. For example, a second edge wall 254A may include an inner wall 258A extending axially between first tip rail 250A and second tip rail 250B, and a second edge wall 254B may include an inner wall 258B extending axially between second and third tip rails 250B, 250C (FIG. 5) and radially outwardly from body 240. Inner wall(s) 258 is/are parallel to and circumferentially spaced from a respective second edge wall 254 to define a radially extending pocket 260 therebetween. Radially extending pocket 260 is open in a radial outward direction, but closed at a radial inward direction. Inner wall(s) 258 has an exit opening 262 defined therein for cooling passage(s) 246 defined in body 240 and extending circumferentially therein. Exit opening(s) 262 circumferentially face into radially extending pocket 260. Second edge wall 254 may also include at least one opening 264 therethrough. Exit opening(s) 262 for at least one of cooling passages 246 may be linearly aligned with opening(s) 264 through second edge wall 254. Hence, coolant exiting cooling passage(s) 246 may exit through radially extending pocket 260 or through opening(s) 264 in second edge wall 254.

Referring to FIGS. 5-7, in conventional tip shrouds, both edge walls 252, 254 have second edge wall arrangements 256, i.e., the configuration illustrated relative to second edge wall 254 in FIG. 7. In accordance with embodiments of the disclosure, it has been discovered that inner wall 258 provides a mass of material near circumferentially-facing edge(s) 234 and/or 236 that is not necessary and that may create a mass imbalance that causes bending moments that exacerbate creep issues. As shown in FIG. 6, tip shroud 220 and, in particular, first edge wall arrangement 238, according to embodiments of the disclosure, includes an exit surface 270 adjacent first edge wall 252, rather than inner wall 258 (FIG. 7). Exit surface 270 includes an exit opening 272 defined therein through which at least one of plurality of cooling passages 246 exits body 240. In FIG. 6, two exit openings 272 are shown, but any number may be employed—see FIGS. 4 and 5. Exit surface 270 is angled (see angle α) relative to circumferentially facing surface 253 of first edge wall 252 in a range of 15° to 80°. In this manner, in a first edge wall arrangement 238, coolant is projected toward first edge wall 252 to cool with similar efficacy as a second edge wall arrangement 256 including inner wall 258 and pocket 260 arrangement (FIG. 7), but without the mass of inner wall 258.

Tip shroud 220 can be initially manufactured with exit surface 270 therein using any now known or later developed manufacturing process, e.g., casting, additive manufacture, etc. Alternatively, exit surface 270 may be formed in a tip shroud 220 manufactured with inner wall 258 (FIG. 7) on first edge wall 252 and may be machined to remove inner wall 258 (FIG. 7), e.g., grinding, cutting, or otherwise physically removing inner wall 258, to create exit surface 270 (FIG. 6). In any event, as shown best in FIG. 5, first edge wall 252 and exit surface 270 may extend axially between a pair of axially opposing, radially extending walls 276 in body 240. Radially extending walls 276 may be spaced from, for example, respective tip rails, such as tip rails 250A, 250B. One of the radially extending walls 276 is also shown in FIG. 6.

As shown in FIGS. 5 and 6, first edge wall 252 may include at least one opening 278 therethrough, so coolant exiting exit opening(s) 272 in exit surface 270 can cool first edge wall 252 and other downstream structure. In one non-limiting example, exit opening(s) 272 for at least one of plurality of cooling passages 246 may be linearly aligned with opening(s) 278 in first edge wall 252, e.g., there could be one-to-one alignment of openings. However, this is not necessary in all instances. Any number of exit openings 272 and/or openings 278 may be employed.

As shown in FIG. 5, where tip shroud 220 includes more than two tip rails 250, i.e., 250A-C, the above-described arrangement may be repeated between the different pairs of tip rails 250. More particularly, as shown between tip rails 250B, 250C, tip shroud 220 may include another first edge wall arrangement 238 including first edge wall 252B extending axially and radially outwardly from body 240, e.g., between tip rails 250B-C, on pressure side 204 of airfoil 202. First edge wall 252B includes circumferentially facing surface 253 (FIG. 6). Between tip rails 250B, 250C, another plurality of cooling passages 246B are defined in body 240 and extend circumferentially therein. Here, a second exit surface 270B is adjacent first edge wall 252B. Second exit surface 270B has the same arrangement as shown in FIG. 6. That is, exit surface 270B (FIG. 5) has an exit opening 272B (FIG. 5) defined therein through which at least one of cooling passages 246B exits body 240. Second exit surface 270B is angled (angle α) relative to circumferentially facing surface 253 of first edge wall 252B in a range of 15° to 80°. Any number of first edge wall arrangements 238 can be employed.

FIG. 8 shows a radially outward perspective view of trailing edge 210 of airfoil 202 and leading circumferential-facing edge 234 of tip shroud 220; and FIG. 9 shows a radially inward perspective view of trailing edge 210 of airfoil 202 and leading circumferential-facing edge 234 of tip shroud 220. Referring to FIGS. 4, 5 and 9, to further reduce mass imbalance, tip shroud 220 may include a curved opening 290 defined in a trailing edge 232 of body 240 adjacent trailing edge 210 of airfoil 202. In the example shown, curved opening 290 is on pressure side 204 of airfoil 202. Curved opening 290 is formed in an area of body 240 that normally extends circumferentially forward of aft-most tip rail 250C and trailing edge 210 of airfoil 202. In some situations, adjacent tip shrouds 220 have interlocking surfaces, sometimes referred to as Z-notches for their Z-like shape. Here, as shown in FIG. 4, curved opening 290 is not filled by body 240 of an adjacent tip shroud 220 and does not interlock with an adjacent surface. In one embodiment, curved opening 290 defines a plane angled (angle β) in a range of 15° and 45° relative to a radial direction Z.

Figure 10:
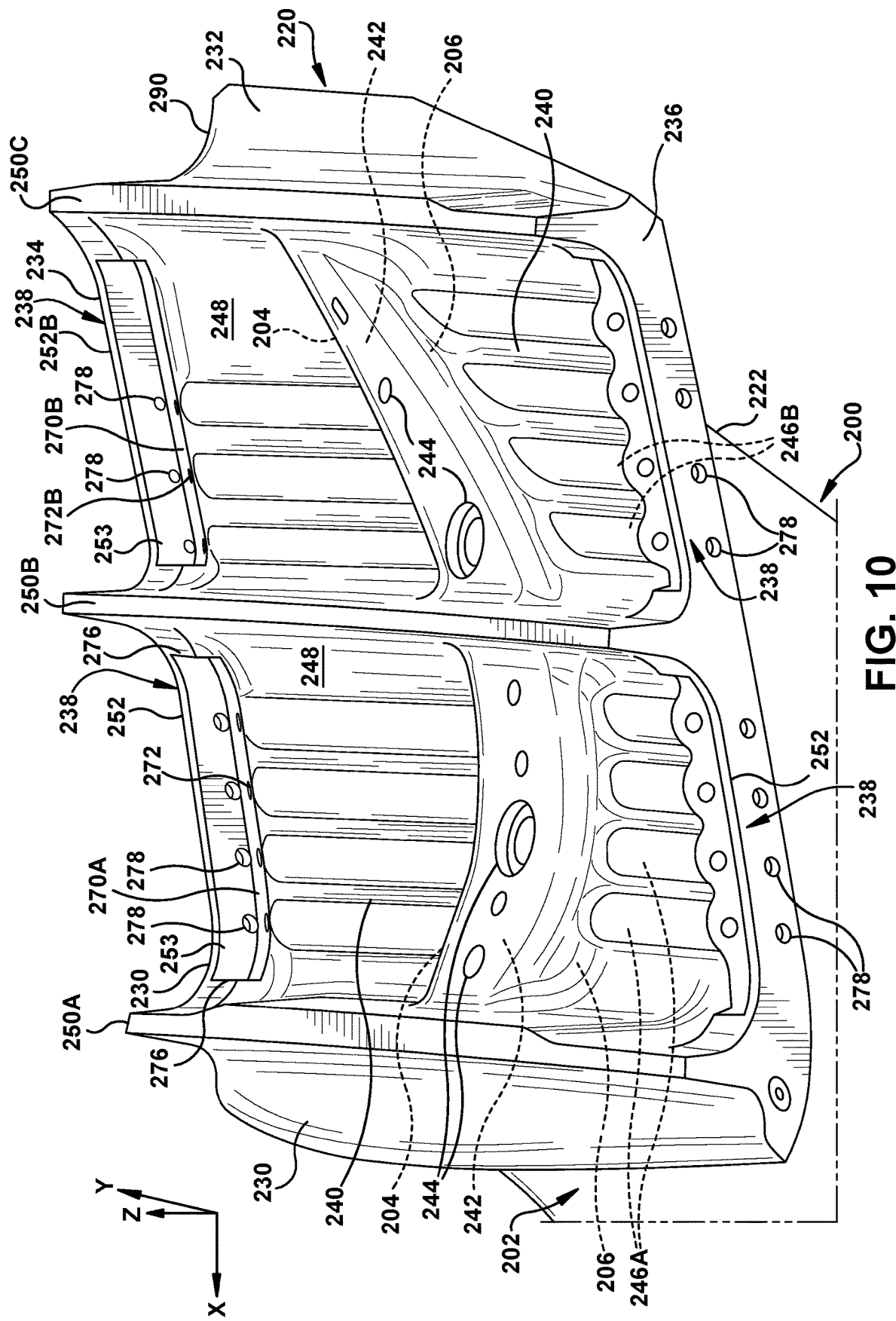
FIG. 10 shows a perspective view of a tip shroud, according to alternative embodiments of the disclosure.

FIG. 10 shows a perspective view of tip shroud 220, according to alternative embodiments of the disclosure. FIG. 10 shows an embodiment including first edge wall arrangements 238 along both leading circumferentially-facing edge 234 and trailing circumferentially-facing edge 236. Here, a mass imbalance may not be present, but mass reduction is still desired.

Figure 11:
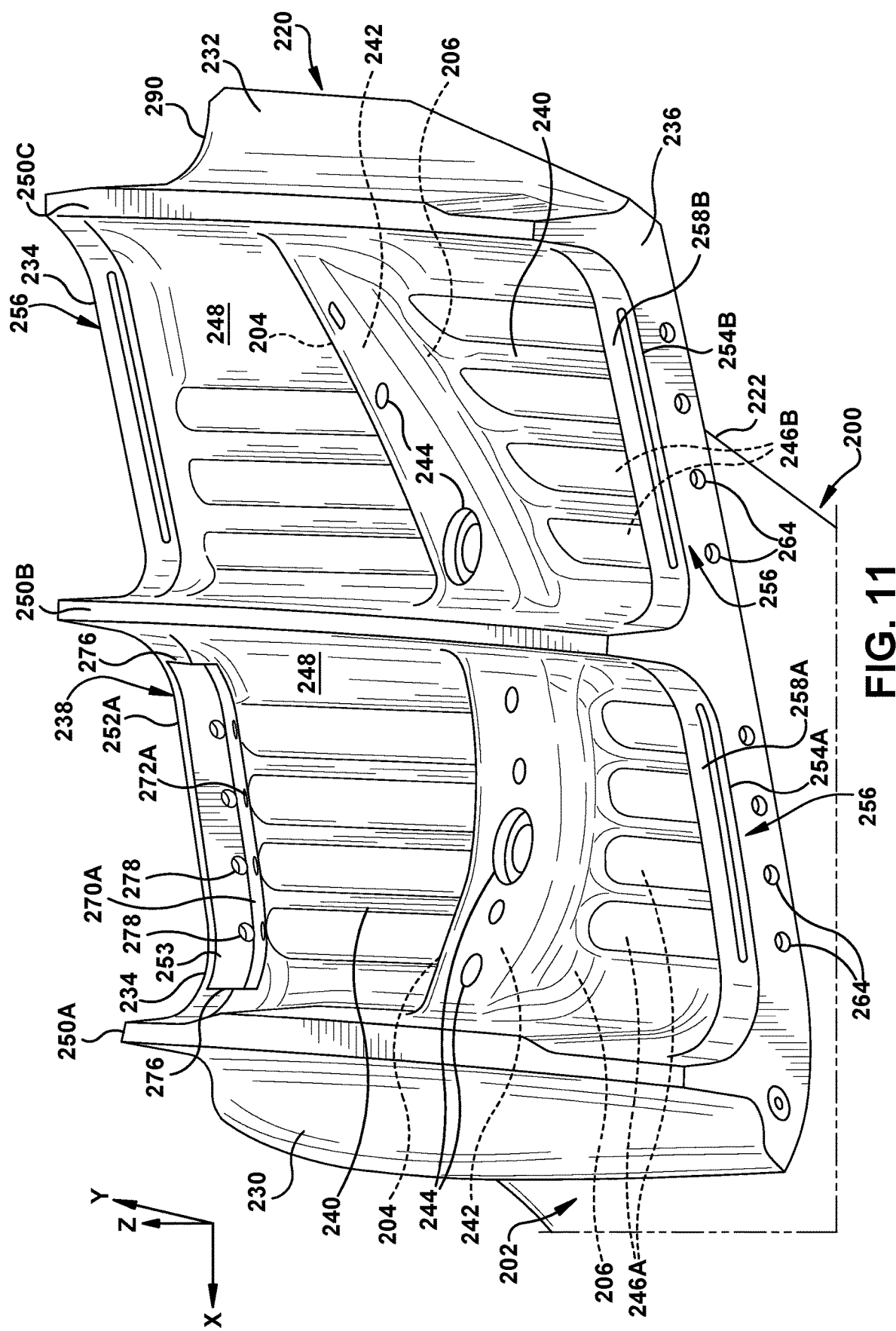
FIG. 11 shows a perspective view of a tip shroud, according to alternative embodiments of the disclosure.

FIG. 11 shows a perspective view of tip shroud 220, according to further alternative embodiments of the disclosure. FIG. 11 shows an embodiment including one first edge wall arrangement 238 along leading circumferentially-facing edge 234 at only one location (e.g., between tip rails 250A-B). Here, a mass imbalance may be present only in tip shroud 220 near leading edge 204 of airfoil 202, such that less mass reduction is desired than the FIG. 5 embodiment.

Figure 12:
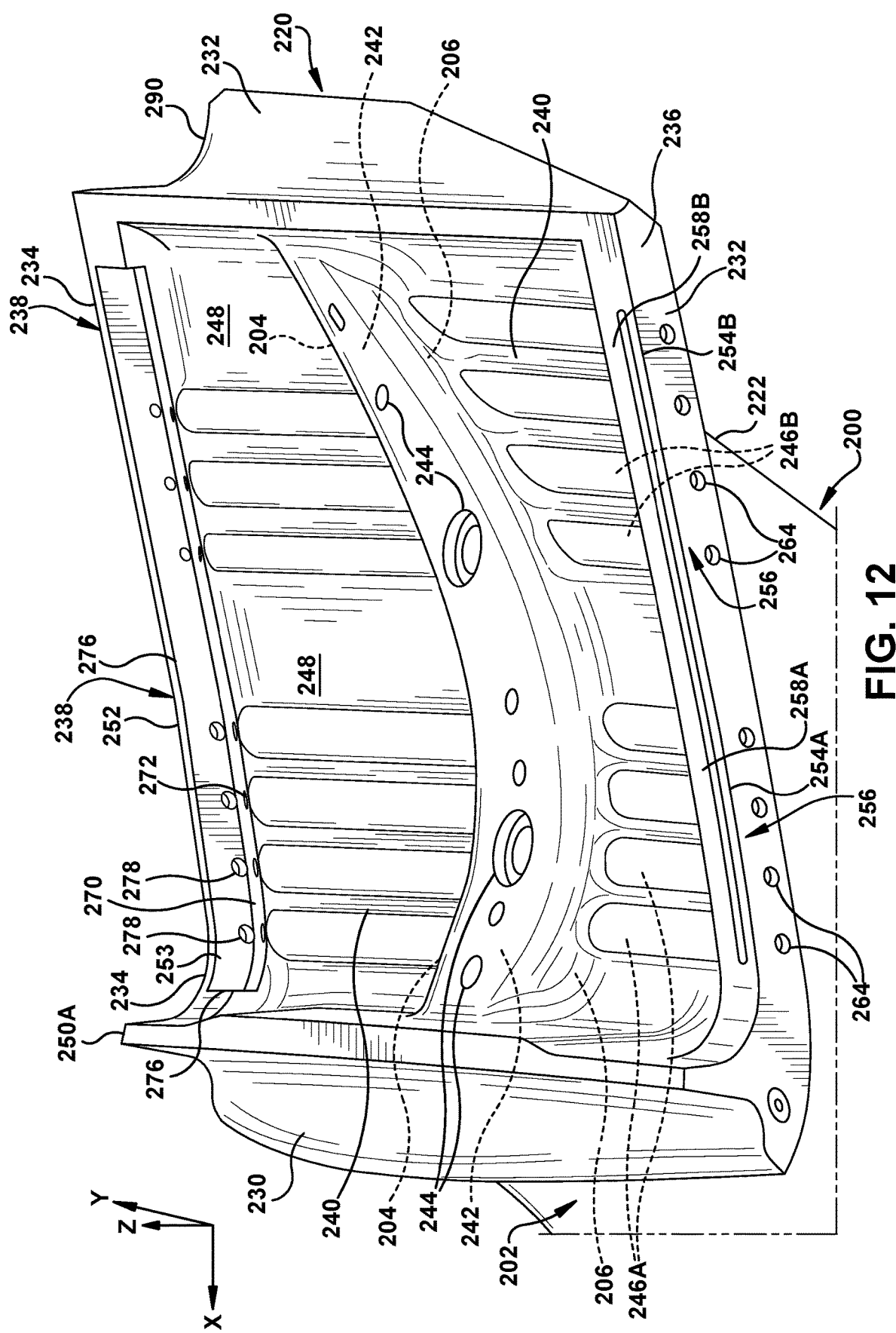
FIG. 12 shows a perspective view of a tip shroud, according to other alternative embodiments of the disclosure.

FIG. 12 shows a perspective view of tip shroud 220, according to other embodiments of the disclosure. FIG. 12 shows an embodiment including first edge wall arrangements 238 as in FIG. 5, but without tip rails 250B-C. That is, only one tip rail 250A is present. As illustrated, where not confined by tip rails 250, first and second wall arrangements 238, 256 may have any desired axial length.

Figure 13:
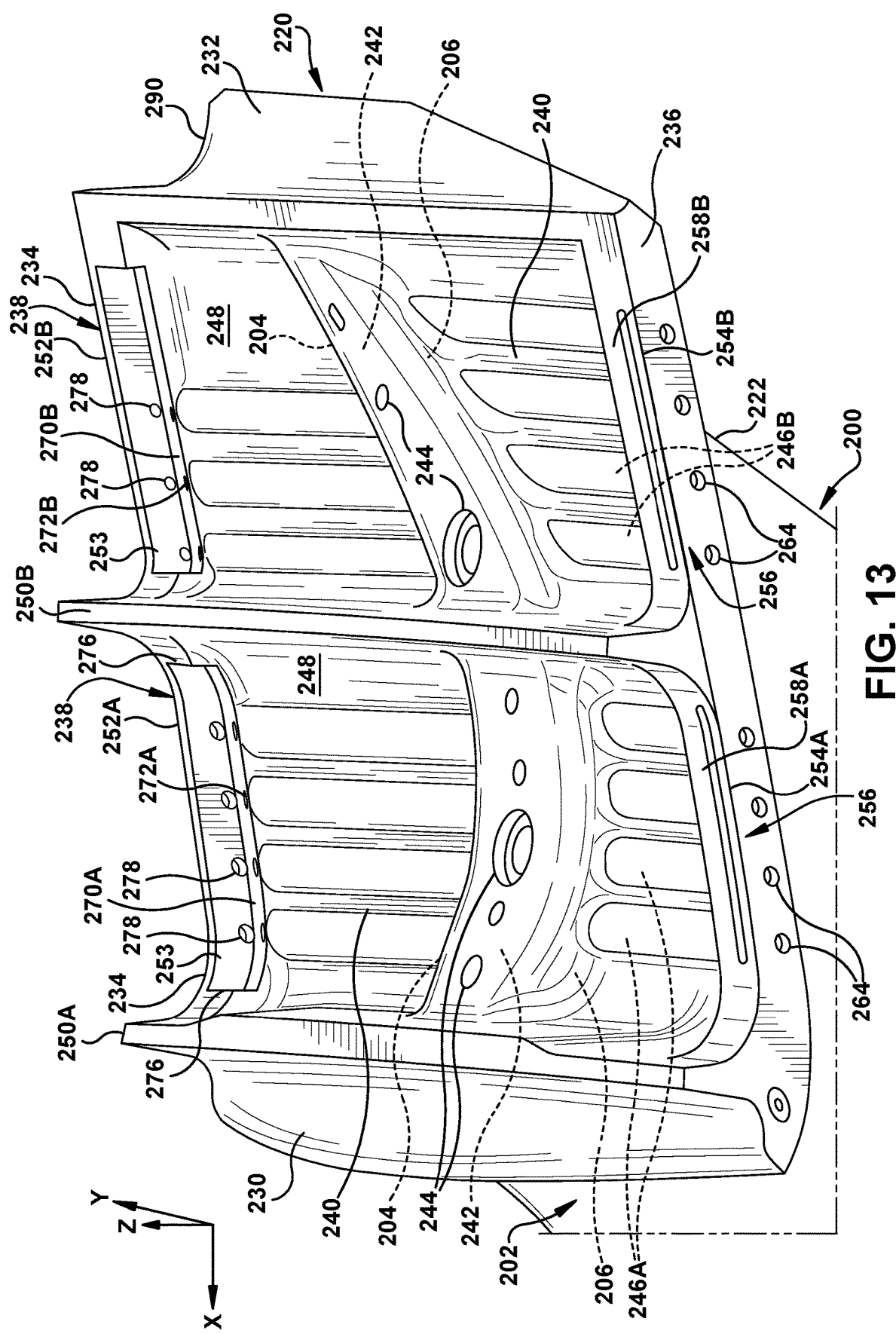
FIG. 13 shows a perspective view of a tip shroud, according to other embodiments of the disclosure.

FIG. 13 shows a perspective view of tip shroud 220, according to other embodiments of the disclosure. FIG. 13 shows an embodiment including first edge wall arrangements 238 along leading circumferentially-facing edge 234, but with only two tip rails 250A-B. It will be recognized that first edge wall arrangement 238 can be used in any location on tip shroud 220 in which mass reduction is desired, e.g., to address a mass imbalance. Other arrangements, not illustrated, may also be possible.

Figure 15:
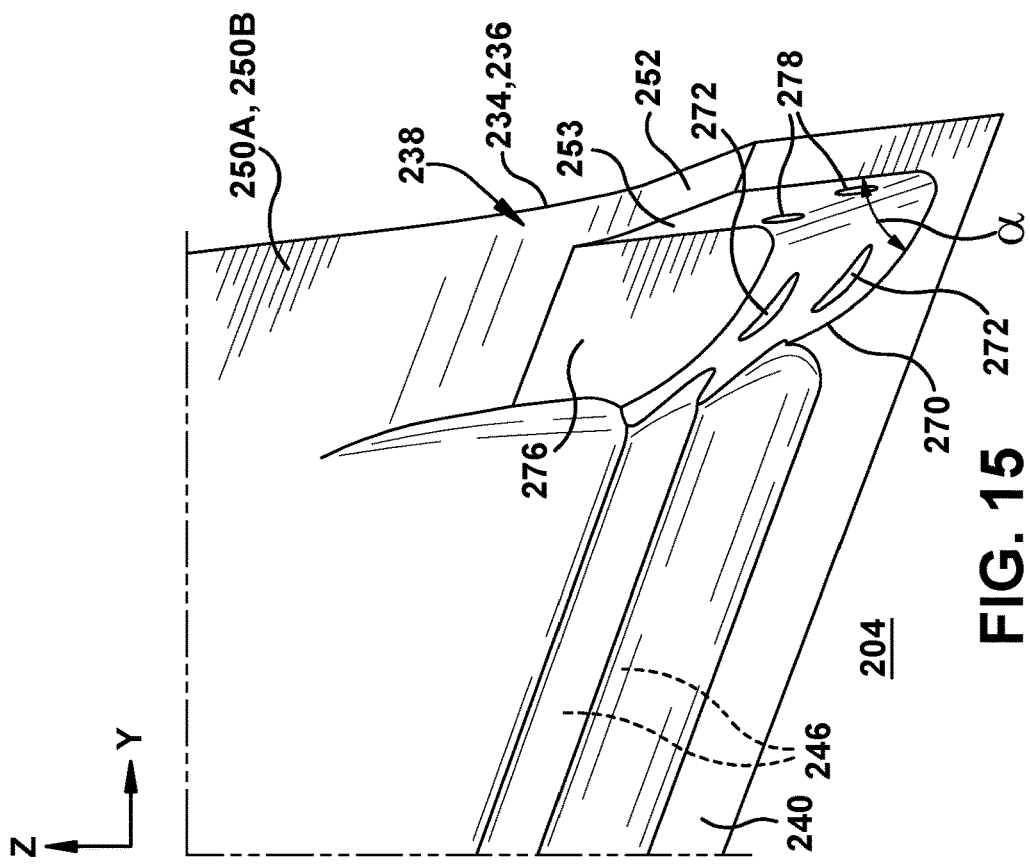
FIG. 15 shows a cross-sectional view similar to FIG. 6 of an exit surface, according to other embodiments of the disclosure.
Figure 14:
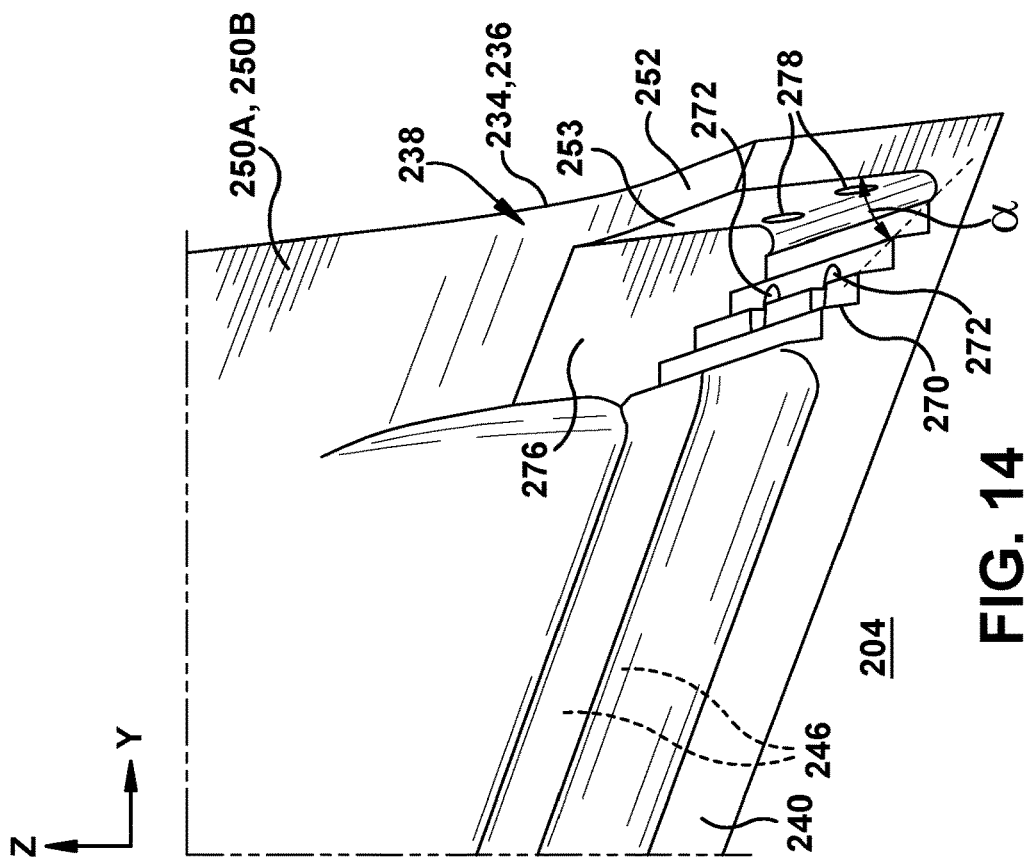
FIG. 14 shows a cross-sectional view similar to FIG. 6 of an exit surface, according to alternative embodiments of the disclosure.

As illustrated, for example, in FIG. 6, exit surface 270 has a planar surface. In other embodiments, exit surface 270 may generally have the angle with circumferentially facing surface 253 of first edge wall 252, but may not be planar. FIGS. 14-15 show cross-sectional views of exit surface 270 of tip shroud 220, according to alternative embodiments of the disclosure. In FIG. 14, exit surface 270 is stepped. Here, exit surface 270 may be made by a number of machining steps, and angle α may be defined by a consistent element of the steps, e.g., outer corners thereof. In FIG. 15, exit surface 270 may be slightly arced, e.g., inwardly, while generally retaining angle α, e.g., from a point where exit surface 270 meets first edge wall 252 and a radially outer-most point of exit surface 270 over exit openings 272 of cooling passages 276. Exit surface 270 can have a number of other shapes within the scope of the disclosure.

Embodiments of the disclosure provide a tip shroud with a first edge wall arrangement including an exit surface that includes exit opening(s) defined therein, through which at least one of the tip shroud's cooling passages exits the body. The creation of the exit surface is accomplished by removal of mass that otherwise contributes to mass imbalance, while retaining the cooling efficacy of a second wall arrangement. Embodiments of the disclosure can also provide the trailing edge of the tip shroud body with a curved opening near the trailing edge of the airfoil to remove additional mass.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. A tip shroud for a turbine blade, comprising:
   a body coupled to a radial outer end of an airfoil of the turbine blade, the airfoil including a pressure side and a suction side and the body including a leading circumferential-facing edge and a trailing circumferential-facing edge;
   at least one tip rail extending radially outwardly from the body and extending generally along a circumferential length of the body;
   a first plurality of cooling passages defined in the body and extending circumferentially therein; and
   at least one first edge wall arrangement along at least one of the leading circumferential-facing edge and the trailing circumferential-facing edge of the body, each first edge wall arrangement including:
   a first edge wall extending axially and radially outwardly from the body along the at least one of the leading circumferential-facing edge and the trailing circumferential-facing edge of the body, the first edge wall including a first circumferentially facing surface; and
   an exit surface adjacent the first edge wall, the exit surface having an exit opening defined therein through which at least one of the first plurality of cooling passages exits the body;
   wherein the exit surface is angled relative to the first circumferentially facing surface of the first edge wall in a range of 15° to 80°.

2. The tip shroud of claim 1, wherein the first edge wall and the exit surface extend axially between a pair of axially opposing, radially extending walls in the body.

3. The tip shroud of claim 1, wherein the first edge wall includes at least one opening therethrough.

4. The tip shroud of claim 3, wherein the exit opening for the at least one of the first plurality of cooling passages is linearly aligned with the at least one opening in the first edge wall.

5. The tip shroud of claim 1, further comprising a curved opening defined in a trailing edge of the body adjacent a trailing edge of the airfoil, wherein the curved opening is not filled by the body of an adjacent tip shroud.

6. The tip shroud of claim 5, wherein the curved opening has a plane angled in a range of 15° and 45° relative to a radial direction.

7. The tip shroud of claim 1, further comprising:
   at least one second edge wall arrangement along at least one of the leading circumferential-facing edge and the trailing circumferential-facing edge of the body, each second edge wall arrangement including:
   a second edge wall extending axially and radially outwardly from the body along the at least one of the leading circumferential-facing edge and the trailing circumferential-facing edge of the body; and
   an inner wall extending axially and radially outwardly from the body, the inner wall parallel to and circumferentially spaced from the second edge wall to create a radially extending pocket therebetween, the inner wall having an exit opening defined therein for at least one of a second plurality of cooling passages defined in the body and extending circumferentially therein, the exit opening circumferentially facing into the radially extending pocket.

8. The tip shroud of claim 7, wherein the second edge wall includes at least one opening therethrough.

9. The tip shroud of claim 8, wherein the exit opening for the at least one of the second plurality of cooling passages is linearly aligned with one of the at least one opening through the second edge wall.

10. The tip shroud of claim 1, wherein the at least one tip rail includes a plurality of tip rails, and wherein the at least one first edge wall arrangement is axially positioned between a pair of the plurality of tip rails.

11. The tip shroud of claim 1, wherein the exit surface is not planar.

12. A turbine blade, comprising:
    a root section;
    an airfoil coupled to the root section, the airfoil including a pressure side and a suction side; and
    a tip shroud including:
    a body coupled to a radial outer end of the airfoil of the turbine blade, and the body including a leading circumferential-facing edge and a trailing circumferential-facing edge;
    at least one tip rail extending radially outwardly from the body and extending generally along a circumferential length of the body;
    a first plurality of cooling passages defined in the body and extending circumferentially therein; and
    at least one first edge wall arrangement along at least one of the leading circumferential-facing edge and the trailing circumferential-facing edge of the body, each first edge wall arrangement including:
    a first edge wall extending axially and radially outwardly from the body along the at least one of the leading circumferential-facing edge and the trailing circumferential-facing edge of the body, the first edge wall including a first circumferentially facing surface; and an exit surface adjacent the first edge wall, the exit surface having an exit opening defined therein through which at least one of the first plurality of cooling passages exits the body;

wherein the exit surface is angled relative to the first circumferentially facing surface of the first edge wall in a range of 15° to 80°.

13. The turbine blade of claim 12, wherein the first edge wall and the exit surface extend axially between a pair of axially opposing, radially extending walls in the body.

14. The turbine blade of claim 12, wherein the first edge wall includes at least one opening therethrough.

15. The turbine blade of claim 14, wherein the exit opening for the at least one of the first plurality of cooling passages is linearly aligned with the at least one opening in the first edge wall.

16. The turbine blade of claim 12, further comprising a curved opening defined in a trailing edge of the body adjacent a trailing edge of the airfoil, wherein the curved opening is not filled by the body of an adjacent tip shroud.

17. The turbine blade of claim 12, further comprising:

at least one second edge wall arrangement along at least one of the leading circumferential-facing edge and the trailing circumferential-facing edge of the body, each second edge wall arrangement including:

a second edge wall extending axially and radially outwardly from the body along the at least one of the leading circumferential-facing edge and the trailing circumferential-facing edge of the body; and an inner wall extending axially and radially outwardly from the body, the inner wall parallel to and circumferentially spaced from the second edge wall to create a radially extending pocket therebetween, the inner wall having an exit opening defined therein for at least one of a second plurality of cooling passages defined in the body and extending circumferentially therein, each exit opening circumferentially facing into the radially extending pocket.

18. The turbine blade of claim 17, wherein the second edge wall includes at least one opening therethrough, and wherein the exit opening for the at least one of the second plurality of cooling passages is linearly aligned with one of the at least one opening through the second edge wall.

19. The turbine blade of claim 12, wherein the at least one tip rail includes a plurality of tip rails, and wherein the at least one first edge wall arrangement is axially positioned between a pair of the plurality of tip rails.

20. A gas turbine comprising the turbine blade of claim 12.

* * * * *